United States Patent [19]

Kusunoki et al.

[11] Patent Number: 4,672,180
[45] Date of Patent: Jun. 9, 1987

[54] HEATING APPARATUS WITH PIEZOELECTRIC DEVICE SENSOR

[75] Inventors: Shigeru Kusunoki, Kouriyama; Naoyoshi Maehara, Nara, both of Japan

[73] Assignee: Matsushita Electric Industrial Co., Ltd., Japan

[21] Appl. No.: 850,571

[22] Filed: Apr. 11, 1986

[30] Foreign Application Priority Data

Apr. 11, 1985 [JP] Japan .................................. 60-76939

[51] Int. Cl.⁴ ......................... H05B 6/68; G01R 27/26
[52] U.S. Cl. ............................. 219/494; 219/10.55 B; 219/10.55 R; 73/336.5; 324/61 QL
[58] Field of Search ................. 219/10.55 B, 10.55 R, 219/10.55 E, 494; 340/602; 73/336.5; 324/61 QL, 61 R, 65 R, 109; 310/343

[56] References Cited

U.S. PATENT DOCUMENTS

| | | | |
|---|---|---|---|
| 3,102,183 | 8/1963 | Harrison | 310/343 X |
| 3,467,804 | 9/1969 | Smith | 219/10.55 B |
| 3,838,248 | 9/1974 | Uchida et al. | 310/343 X |
| 3,839,616 | 10/1974 | Risman | 219/10.55 R |
| 4,210,795 | 7/1980 | Lentz | 219/10.55 R X |
| 4,221,129 | 9/1980 | Sidebottom et al. | 73/336.5 |

Primary Examiner—Philip H. Leung
Attorney, Agent, or Firm—Lowe, Price, LeBlanc Becker & Shur

[57] ABSTRACT

In an exhaust passage (37) of a heating apparatus, a piezoelectric device sensor (26) is provided for detecting the heating condition of a heated object (32), such as food in a microwave open heating chamber (31). A piezoelectric device of the sensor may be contained within a metal casing (53) and be hermetically sealed. An output signal from the piezoelectric device sensor is processed by circuitry including an amplifier (27) having a predetermined frequency response so that only particular frequency components lower than that of a conventional a.c. supply are amplified and then compared with a threshold to detect whether a sufficient amount of moisture of hot steam is emitted from the object in the heating chamber of the heating apparatus. The invention may be applied to prevent overheating of food in a microwave oven, temperature control of chemical processes, or the like, to control heating time.

6 Claims, 9 Drawing Figures

HEATING APPARATUS WITH PIEZOELECTRIC DEVICE SENSOR

BACKGROUND OF THE INVENTION

1. Field of the Invention

This invention relates generally to heating apparatus, and particularly to a sensor for detecting the heating condition of an object to be heated.

2. Prior Art

In a heating apparatus, such as a microwave oven used for cooking, food to be cooked is apt to be overheated because of very high heating speed. Therefore, it is necessary to detect the heating condition of the heating object, such as food, so as to stop heating or reduce heating power.

One conventional example of a sensor used for detecting heating condition is shown in U.S. Pat. No. 3,839,616. However, the technique disclosed in this patent requires relatively complex structure since the variation in the electrical resistance of a sensing element is detected for the detection of heating condition. Furthermore, the sensing element has to be kept clean because it is apt to become dirty.

Another conventional example is disclosed in U.S. Pat. No. 3,467,804. However, this technique also requires complex structure since acoustic impedance is detected by way of an acoustic transmitter and an acoustic receiver, and involves additinal complexities to detect various pieces of food having different shapes and dimensions.

SUMMARY OF THE INVENTION

The present invention has been developed in order to eliminate the above-described drawbacks inherent in conventional heating condition detecting devices.

It is, therefore, an object of the present invention to provide a new and useful heating apparatus with an improved heating condition detecting sensor.

According to a feature of the present invention, a piezoelectric device is used as a heating condition sensor so as to detect hot steam emitted from a heated object, such as food in a microwave oven.

According to another feature of the present invention, the heating condition is effectively detected using a new principle, which is found by the present inventors, that low frequency components around 10 Hz of an output signal from a piezoelectric device have a correlation with the amount of hot steam emitted from heating object.

In accordance with the present invention there is provided a heating apparatus comprising: a heating chamber for receiving an object to be heated; a heat source for heating said object; an exhaust passage through which gases in said heating chamber are exhausted; and a piezoelectric device provided to said exhaust passage for producing an output signal indicative of the heating condition of said object.

BRIEF DESCRIPTION OF THE DRAWINGS

The object and features of the present invention will become more readily apparent from the following detailed description of the preferred embodiments taken in conjunction with the accompanying drawings, in which.

The same or corresponding elements and parts are designated by like reference numerals throughout the drawings.

DETAILED DESCRIPTION OF THE INVENTION

Prior to describing a preferred embodiment of the present invention, the above-mentioned conventional arrangements will be described for a better understanding of the present invention.

Figure 1:
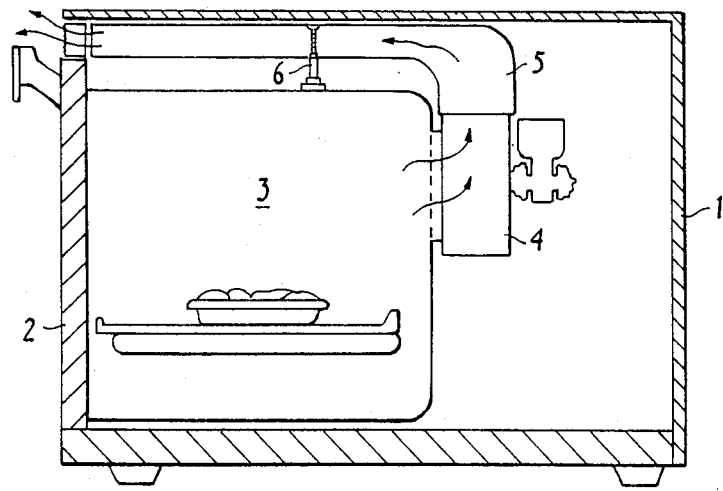
FIG. 1 is a cross-sectional view of a conventional microwave oven.

FIG. 1 shows a microwave oven disclosed in the above-mentioned U.S. Pat. No. 3,839,616. The microwave oven comprises a casing 1 and a door 2 attached thereto to define a heating chamber 3 in which food (not numbered) is shown to be received. As the food is heated, steam is emitted therefrom and is exhausted together with air in the heating chamber 3 via an exhaust fan 4 and an exhaust passage 5. The resistance of sensing element 6 varies as ambient humidity changes. In order to detect the variation in resistance of the sensing element 6, it is necessary to apply a reference a.c. voltage, to a series circuit of the sensing element 6 and to a standard or reference resistor, so that the voltage across the reference resistor is detected. In order to accurately detect the heating condition, the reference voltage should be stabilized. It is also necessary to exercise care in order to reduce variation in the resistance of the reference resistor during production of a large number of product. Furthermore, it is necessary to reduce the thermal time constant of the sensing element 6. Since the sensing element 6 is apt to become dirty due to particles from food or the like, it is arranged to clean the same by heating it to a high temperature. Therefore, complex structure for such heating of the sensing element 6 is needed while additional power consumption is required.

Figure 2:
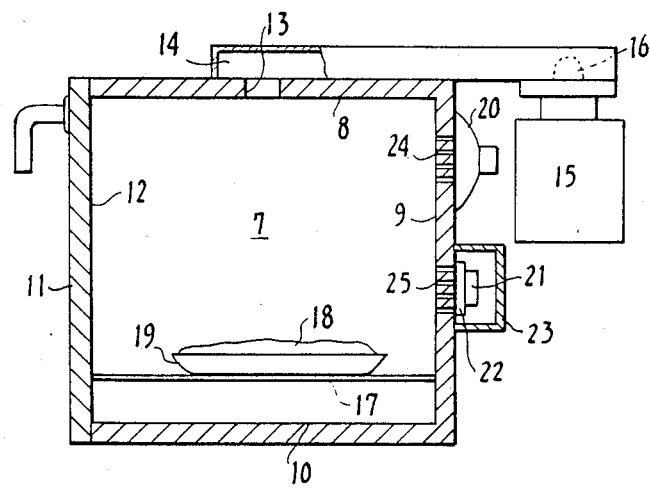
FIG. 2 is a cross-sectional view of another conventional microwave oven.

FIG. 2 shows a microwave oven disclosed in the above-mentioned U.S. Pat. No. 3,467,804. A heating chamber 7 of a microwave oven is formed of an upper wall 8, a rear wall 9, a lower wall 10, side walls 12 and a door 11. Microwave energy generated in a magnetron 15 is supplied from an antenna 16 via a waveguide 14 and a slot 13 made in the upper wall 8 to the inside of the heating chamber 7. Within the heating chamber 7 is provided a shelf 17. A dish 19 containing food 18 to be cooked is shown to be placed on the shelf 17. Openings 24 and 25 are made in the rear wall 9, and an acoustic transmitter 20 provided at the exterior side of the rear wall 9 behind the opening 24, while an acoustic receiver 21 is provided on the same wall behind another opening 25. A pad 22 is interposed between the receiver 21 and the rear wall 9, while a soundproof cover 23 is provided around the receiver 21 and the pad 22.

In this arrangement, in order to detect the amount of steam emitted from the food 18 sound waves are emitted from the acoustic transmitter 20 and are received by the acoustic receiver 21. More specifically, the magnitude of sound waves propagated through the heating chamber 7 is detected to detect the amount of steam emitted from the food 18, using the principle that an acoustic impedance of the air or other gases in the heating chamber 7 varies due to the increase in steam amount. However, since acoustic resonating state changes relate to the dimension of the space in the heating chamber 7, it is difficult to accurately detect the amount of steam when the shape or dimension of the food 18 changes. As a result, further complex improvement is required.

Figure 3:
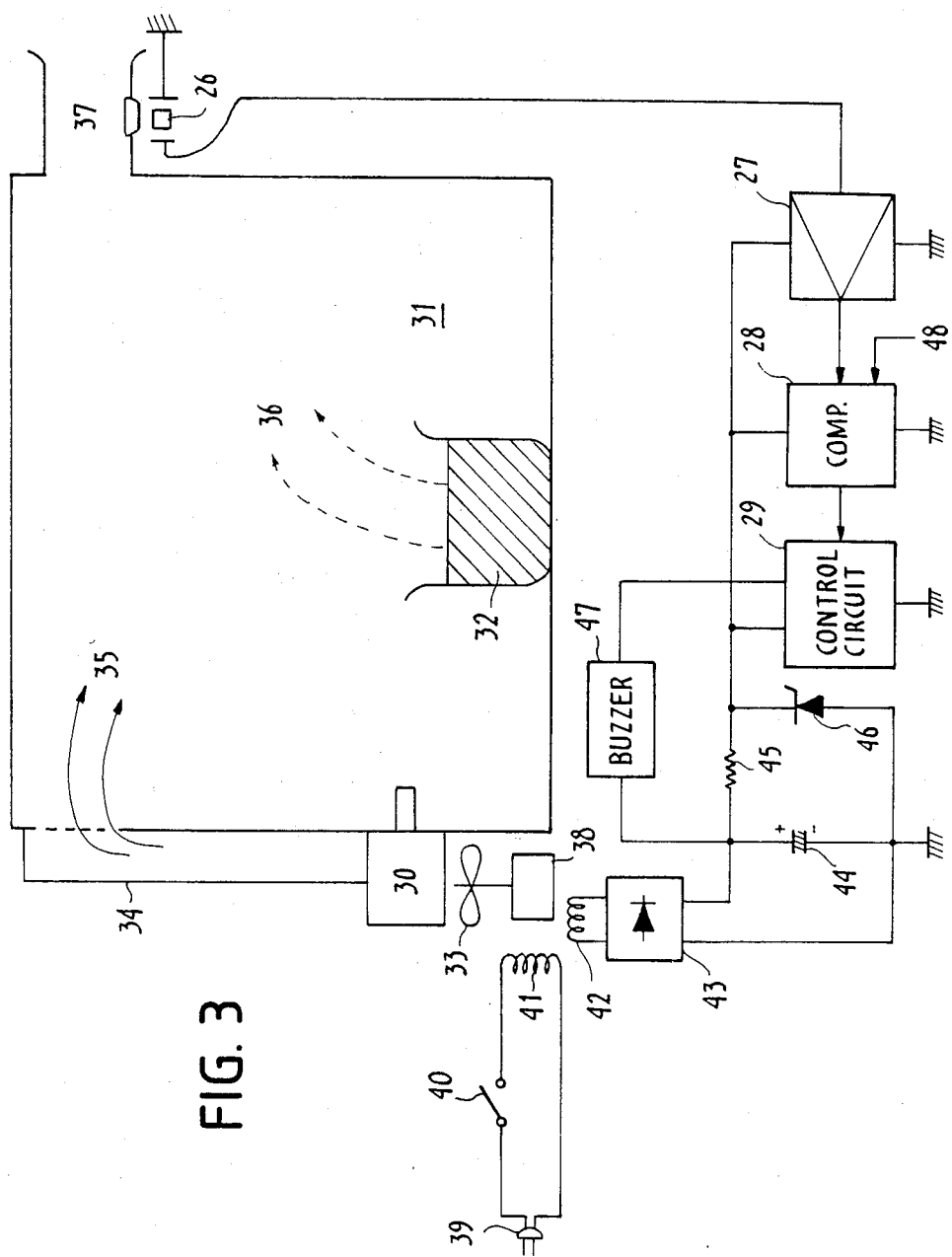
FIG. 3 is a schematic view of an embodiment of heating apparatus according to the present invention.

Referring now to FIG. 3, an embodiment of the present invention will be described in connection with an example where the present invention is applied to a microwave oven.

In a heating chamber 31 of a microwave oven generally denoted at the reference 100, a piezoelectric device sensor 26 is provided in an exhaust pipe or passage 37 so as to be exposed to exhaust gases from the heat chamber 31. The piezoelectric device sensor 26 is connected to an input terminal of an amplifier 27 used for voltage amplification, which amplifier is of the type arranged to pass only a given frequency range signal. An output terminal of the amplifier 27 is connected to an input terminal of a comparator 28 whose output terminal is connected to an input terminal of a control circuit 29 which controls energization of a motor 38 driving a fan 33 with which cooling air is applied to a magnetron 30. Food 32 to be cooked is shown to be placed in the heating chamber 31. The cooling air passed through the magnetron 30 is led via a duct 34 into the heating chamber 31. The flow of cooling air is indicated by way of arrows 35 while the flow of hot gases including moisture or steam emitted from the food 32 is indicated by dotted lines with arrows 36. The cooling air 35 and the above-mentioned gases 36 including moisture emitted from the food 32 are exhausted from the heating chamber 31 via the exhaust pipe 37 to outside.

The fan 33 is driven by a motor M having first and second windings 41 and 42 wound around a motor core 38. The first winding 41 is connected via a power switch 40 and a plug 39 to a conventional a.c. supply line (not shown). The second winding 42 comprises a constant-voltage power source circuit together with a rectifying diode bridge 43, a capacitor 44, a resistor 45, and a zenner diode 46. This constant-voltage power source circuit supplies the above-mentioned amplifier 27, comparator 28 and control circuit 29 with power, and no transformer is required because the voltage fed to the rectifying diode bridge 43 is much lower than that fed to the first winding 41.

When the voltage of the output signal from the amplifier 27 exceeds a threshold or reference voltage 48 fed from an unshown reference voltage source a buzzer 47 connected to an output terminal of the control circuit 29 alerts a user that a sufficient amount of moisture is emitted from the food 32. In the illustrated embodiment, the control circuit 29 may be a switching circuit such as a power transistor for energizing the buzzer 47 in response to the output signal from the comparator 28. Although the buzzer 47 is used in the illustrated embodiment, this buzzer 47 may be replaced some other alarm device if desired.

Moreover, the output signal from the comparator 28 may be used for controlling heating output by cutting off or reducing the same. Where it is intended to control the output power of the magnetron 30, any known control circuit for the same purpose may be used in place of the control circuit 29.

Figure 4:
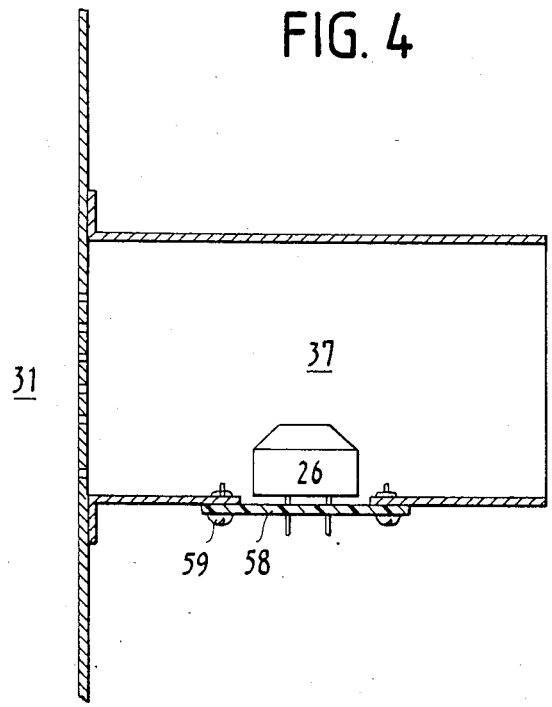
FIG. 4 is a view illustrating how a piezoelectric device sensor is installed in the microwave oven shown in FIG. 3.
Figure 5:
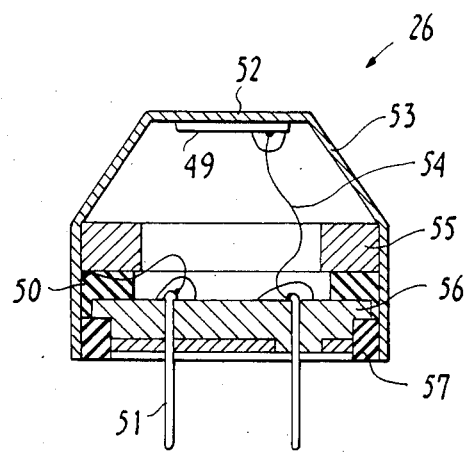
FIG. 5 is a cross-sectional view of the piezoelectric device sensor shown in FIGS. 3 and 4.

FIGS. 4 and 5 show an example of a moisture-proof ultrasonic microphone for 40 kHz used as the piezoelectric device sensor 26 of FIG. 3. More specifically, FIG. 4 shows how to install the ultrasonic microphone 26 and FIG. 5 shows the structure of the same by way of a cross-section. As shown in FIG. 5, the ultrasonic microphone 26 comprises a piezoelectric device 49, a silicone rubber spacer 50, terminals 51, a diaphragm 52, a casing 53, lead wires 54, an inner ring 55, a terminal plate 56, and a silicon rubber supporting member 57. As shown in FIG. 4, the ultrasonic microphone 26 of FIG. 5 is attached to a circuit board 58 which is secured to a wall of the exhaust pipe 37 by way of bolts 59. As shown in FIG. 5, the piezoelectric device 49 is placed in the casing 53 which is hermetically sealed so that no moisture from the food 32 in the heating chamber 31 enters to deteriorate the piezoelectric device 49. In place of such a hermetic sealing, the piezoelectric device 49 may be covered by an epoxy resin or other synthetic resin through dipping. Alternately, the piezoelectric device 49 may be placed in a sealed glass tube.

Figure 6A:
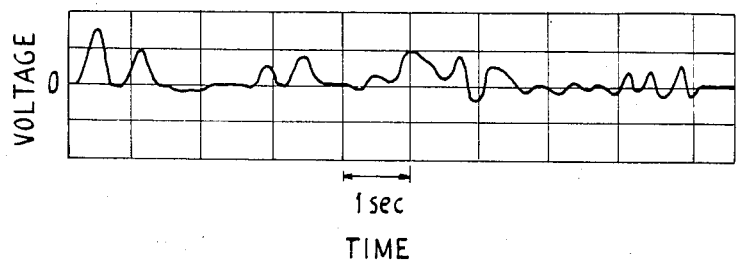
FIGS. 6A and 6B show characteristics of output voltage from the piezoelectric device sensor of FIG. 5.
Figure 6B:
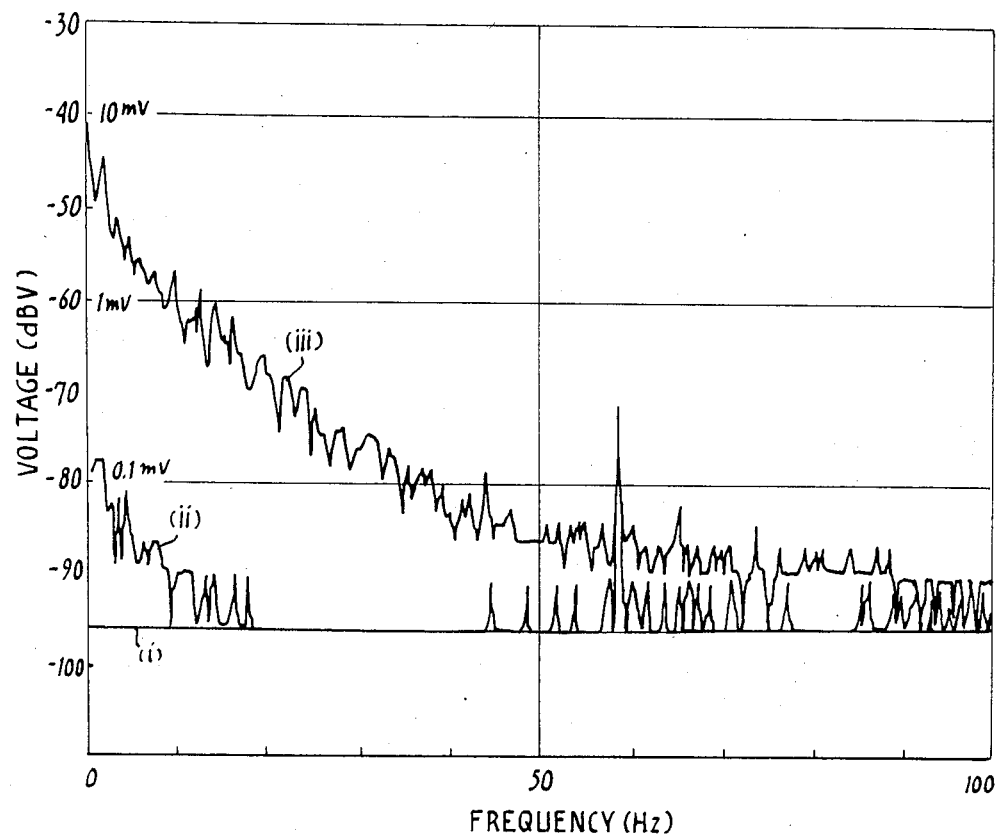

FIGS. 6A and 6B are diagrams showing characteristics of a signal and noise of the above-mentioned piezoelectric device sensor 26, which characteristics are obtained when water positioned in the heating chamber 31 as a load is boiled. More particularly, FIG. 6A shows variation in voltage between terminals of the piezoelectric device sensor 26 as a function of time, while FIG. 6B shows a frequency spectrum of the output voltage of the same. In FIG. 6B, waveform (i) shows the spectrum before the microwave oven is operated, waveform (ii) shows the spectrum immediately after power is supplied to the microwave oven, and waveform (iii) shows the spectrum at the time water in the heating chamber 31 boils. As will be understood from the comparison of these three waveforms (i), (ii) and (iii), the output signal from the ultrasonic microphone or piezoelectric device sensor 26 includes a low frequency component, which is between 0 and 50 Hz, which has a large amplitude when air including hot steam is directed to the ultrasonic microphone 26. In FIG. 6B, the peak in waveform (iii) around 60 Hz is noise caused from commercial supply line.

The reason why such low frequency components can be detected by using the ultrasonic sensor 26 is believed to be as follows: when gases passing through the exhaust pipe 37 include warm steam having a high heat content, the piezoelectric device 49 experiences mechanical forces due to thermal change caused from such high content in the gases contacting the same. As a result, polarization occurs in the piezoelectric device 49 to develop a voltage. Such as piezoelectric device 49 may comprise quartz, Rochelle salt crystal ($KNaC_4H_4O_6$), lead titanate ($PbTiO_3$), barium titanate ($BaTiO_3$) or the like.

Figure 7:
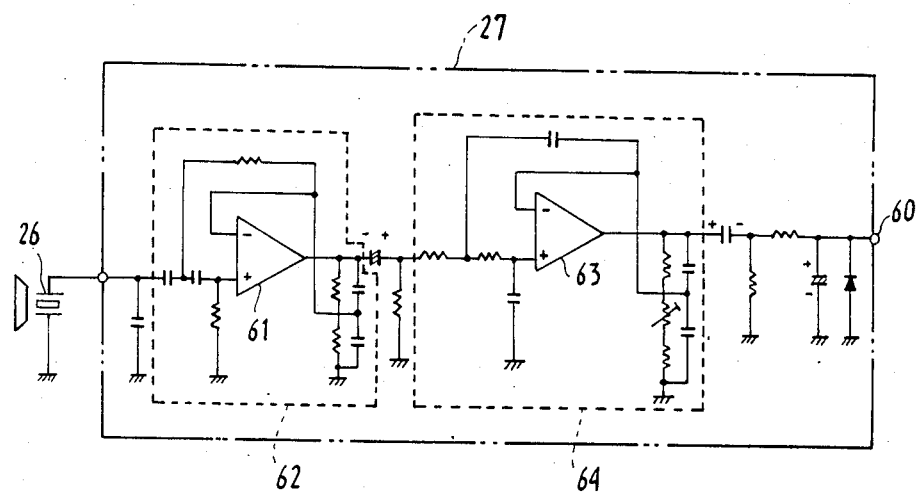
FIG. 7 is a circuit diagram of an amplifier shown in FIG. 3.

FIG. 7 presents the circuit arrangement of the amplifier 27 used in the embodiment of FIG. 3. An output terminal of the piezoelectric device sensor 26 is processed so that frequency components above 3 Hz are selected by way of a high-pass filter including an operational amplifier 61 and, subsequently, other frequency components below 15 Hz are selected by way of a low-pass filter including an operational amplifier 63. As a result, an output signal within a frequency range between 3 and 15 Hz is obtained at an output terminal 60.

Figure 8:
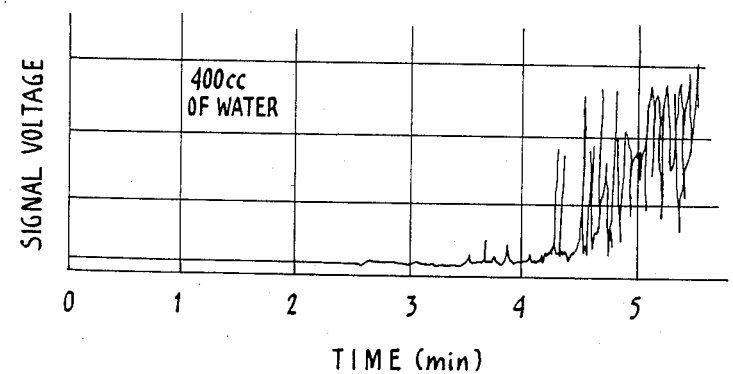
FIG. 8 is a diagram of an output signal from the amplifier shown in FIG. 3.

FIG. 8 shows the voltage variation over time of an output signal at the output terminal 60 of the amplifier 27 shown in FIG. 7. This output signal was obtained through an experiment, in which 400 milliliter of water was placed in the heating chamber 31 to be heated by way of microwaves to perform dielectric heating. Although the output signal magnitude is small and substantially constant at the beginning of heating, the magnitude increases after four minutes or so. It has been confirmed through the experiment that this timing of the signal level increase substantially corresponds to the time when the watwer starts boiling. Therefore, from such detected increase in the magnitude of the output signal from the piezoelectric sensor 26, one can infer the time at which water in the heating chamber 31 boils.

Using this principle, it is now possible to perform automatic cooking through the detection of the output voltage from the piezoelectric device sensor 26. For instance, the heating output of the microwave oven may be reduced or stopped so as to prevent undesirable overheating. Furthermore, the output signal from the piezoelectric device sensor 26 may be used so that additional heating is performed for a given period of time after the output voltage from the piezoelectric device sensor 26 increases rather than simply terminating heating. In this way, a microwave oven can be controlled so that sophisticated cooking is now performed.

To this end, various constants (including zero) are stored in advance in the control circuit 29 to correspond to various groups of food, and one of these constants is selected by a user through a switch or the like before cooking. Then the microwave oven strts cooking with its power switch turned on. As time passes, an output signal from the comparator 28 changes in response to the increase in level of the output signal from the amplifier 27. A time period required until the output signal from the comparator 28 changes is detected and is multiplied by a constant stored in the control circuit 29 to obtain a product indicative of a time period. Using this time period, the microwave oven may be continuously energized for this additional time period to complete cooking since the detection of moisture by the piezoelectric device sensor 26 does not necessarily indicate the completion of cooking because it is necessary to apply heat not only to the surface or skin portion of food body but also to the very inside of the same.

Moreover, another function may be added if desired. More specifically, it is desired that the level increase indicative of the detection of moisture from food is distinguished from noise voltage appearing immediately after the power switch of the microwave oven is turned on. To this end, a timer may be provided to the control circuit 29 so as to mask the same for a given period of time after the power switch is turned on. With this arrangement, malfunctions due to noise voltage appearing immediately after the power switch is turned on can be effecively prevented.

The present invention has the following advantages in addition to its original function of detecting moisture so as to detect the cooking condition of food in the heating chamber 31.

(1) Since polarization voltage developed in a piezoelectric device is detected and processed, the complex circuit arrangement involving an a.c. reference voltage source and a standard resistor required in one of the aforementioned conventional examples becomes unnecessary. Thus high accuracy of parts is not required, so that a detection circuit can be manufactured at low cost which is suitable for mass production.

(2) Since the detection circuit is of passive type such that only a detection element is provided, the number of required parts is reduced to less than one half that of a conventional arrangement using a transmitter and a receiver.

(3) Since the detection signal from the piezoelectric device sensor has low frequency components, the magnitude of noise on operation of the microwave oven is relatively small, and thus detection can be done with high signal-to-noise ratio.

(4) In the conventional arrangement utilizing a humidity-sensitive resistor, since it is mainly the crystal grain boundary of an element that is used, it is necessary that gases including moisture act directly on the grain boundary. As a result, such a sensor is apt to become dirty. By contrast, the piezoelectric device sensor used in the present invention does not suffer from the problem of becoming dirty since sufficient sensitivity is ensured even if the diaphragm of the sensor is covered and sealed. It has been experimentally determined, that the signal level hardly changes in connection with a frequency range from 5 to 10 Hz even if silicone grease is painted on the surface of the diaphragm to a thickness of 0.5 millimeters. Therefore, no heater for burning away extraneous dirt is needed, and it is not necessary to be concerned about thermal time constants.

(5) When the amplifier 27 responsive to the piezoelectric device sensor 26 is constructed such that no d.c. voltage is applied to the piezoelectric device sensor 26, the polarization characteristic can be used with high stability for a long period of time. Furthermore, when an amplifier is used which amplifies components whose frequency is lower than that of commercial a.c. supply, the signal-to-noise ratio is extremely high.

(6) When the present invention is applied to a microwave oven as shown in FIG. 3, even in the event that the time when boiling begins cannot be detected for some reason, the piezoelectric device sensor 26 produces an output signal of high voltage when the food in the heating chamber 31 starts smoking. This is because exhaust gases including smoke from the food have a thermal content which is higher than that of the abovementioned warm steam. Therefore, burning of the food can be effectively prevented. Also prevented are circumstances where the exhaust pipe 37 catches on fire. In this way, when the present invention is applied to microwave ovens or other heating apparatus, overheating as well as actual burning thereof is effectively prevented so that the apparatus is very safe.

Although the embodiment of the present invention has been described with reference to a microwave oven used for cooking food, the present invention may be applied to any other heating apparatus so as to prevent overheating and to control the period of time for heating. For instance, the present invention may be applicable to temperature control of chemical processes.

The above-described embodiment is just an example of the present invention, and therefore, it will be apparent for those skilled in the art that many modifications and variations may be made without departing from the scope of the present invention.

What is claimed is:

1. A heating apparatus comprising:

(a) a heating chamber for receiving an object to be heated;
(b) a heat source for heating said object;
(c) an exhaust passage through which gases in said heating chamber are exhausted;
(d) a piezoelectric device provided to said exhaust passage for producing a first output signal indicative of the heating condition of said heated object; and
(e) filter means responsive to said first output signal of said piezoelectric device for filtering therefrom a second output signal comprising only frequencies within a particular frequency range indicative of the presence of hot steam.

2. A heating apparatus as claimed in claim 1, wherein: said piezoelectric device is hermetically covered by a casing made of a heat-conductive material.

3. A heating apparatus as claimed in claim 1, further comprising:
(a) an amplifier producing a third output signal responsive to said second output signal from said filter means;
(b) a comparator for producing a fourth output signal when said third output signal from said amplifier exceeds a predetermined threshold value; and
(c) an alarming device responsive to said fourth output signal from said comparator for indicating a predetermined heating condition of said object.

4. A heating apparatus as claimed in claim 3, further comprising:
means for selecting from said second output signal only those frequency components which have frequencies lower than that of a conventional a.c. supply, so that only such selected frequency components of second said output signal from said filter means are amplified by said amplifier.

5. A heating apparatus as claimed in claim 1, further comprising:
(a) an amplifier producing a third output signal responsive to said second output signal from said filter means;
(b) a comparator for producing a fourth output signal when said third output signal from said amplifier exceeds a predetermined threshold value; and
(c) a control circuit responsive to said fourth output signal from said comparator for controlling said heat source.

6. A heating apparatus as claimed in claim 5, further comprising:
means for selecting from said second output signal only those frequency components which have frequencies lower than that of a conventional a.c. supply, so that only such selected frequency components of said second output signal from said filter means are amplified by said amplifier.

* * * * *